United States Patent [19]
Collins

[11] Patent Number: 5,288,441
[45] Date of Patent: Feb. 22, 1994

[54] SYSTEM AND METHOD FOR EXTRUDER FROST LINE DETECTION

[76] Inventor: Steven L. Collins, 282 Emerald Dr., Yardley, Pa. 19067

[21] Appl. No.: 996,450

[22] Filed: Dec. 24, 1992

[51] Int. Cl.⁵ .............................................. B29C 47/92
[52] U.S. Cl. .................................. 264/40.2; 264/40.3; 264/40.6; 264/40.7; 264/564; 425/140; 425/141; 425/144; 425/326.1
[58] Field of Search .................... 264/40.2, 40.3, 40.6, 264/40.1, 40.7, 564; 425/140, 141, 326.1, 144

[56] References Cited

U.S. PATENT DOCUMENTS

| | | |
|---|---|---|
| 3,459,841 | 8/1969 | Seiler . |
| 4,101,614 | 7/1978 | Havens . |
| 4,189,288 | 2/1980 | Halter ................... 425/140 |
| 4,246,212 | 1/1981 | Upmeier . |
| 4,325,897 | 4/1982 | Zerle et al. ............... 264/40.2 |
| 4,355,966 | 10/1982 | Sweeney et al. ............ 264/40.2 |
| 4,402,656 | 9/1983 | Schott, Jr. ................ 264/40.2 |
| 4,551,289 | 11/1985 | Schwab et al. ............. 264/40.2 |
| 4,606,879 | 8/1986 | Cerisano . |
| 4,684,487 | 8/1987 | Gawrisch ................. 264/40.2 |
| 4,711,747 | 12/1987 | Halter ................... 425/140 |
| 4,808,359 | 2/1989 | van der Molen . |
| 4,832,897 | 5/1989 | van der Molen . |
| 5,096,634 | 3/1992 | Tsadares et al. ........... 264/40.2 |
| 5,124,094 | 6/1992 | Lenius et al. ............. 264/40.3 |
| 5,128,076 | 7/1992 | Akselrod et al. .......... 264/40.3 |

FOREIGN PATENT DOCUMENTS

| | | | |
|---|---|---|---|
| 3628056 | 4/1987 | Fed. Rep. of Germany ..... 264/40.2 |
| 3802146 | 2/1989 | Fed. Rep. of Germany ..... 264/40.6 |
| 60-234821 | 10/1985 | Japan .................... 425/140 |

*Primary Examiner*—Jeffery Thurlow
*Attorney, Agent, or Firm*—Woodcock Washburn Kurtz Mackiewicz & Norris

[57] ABSTRACT

A system for monitoring and controlling the output of extruder apparatus for producing a blown synthetic resin film. An infrared imaging system provides for measuring the temperature of the blown film simultaneously at multiple points on the film between the blowing head and the frost line of the film bubble. The multidimensional temperature profile measured by an infrared camera is processed in a computer controller in order to provide control inputs to various components of the extruder apparatus. The extruder apparatus is controlled so as to maintain a desired temperature profile substantially at that which is known to provide a high quality end product.

30 Claims, 2 Drawing Sheets

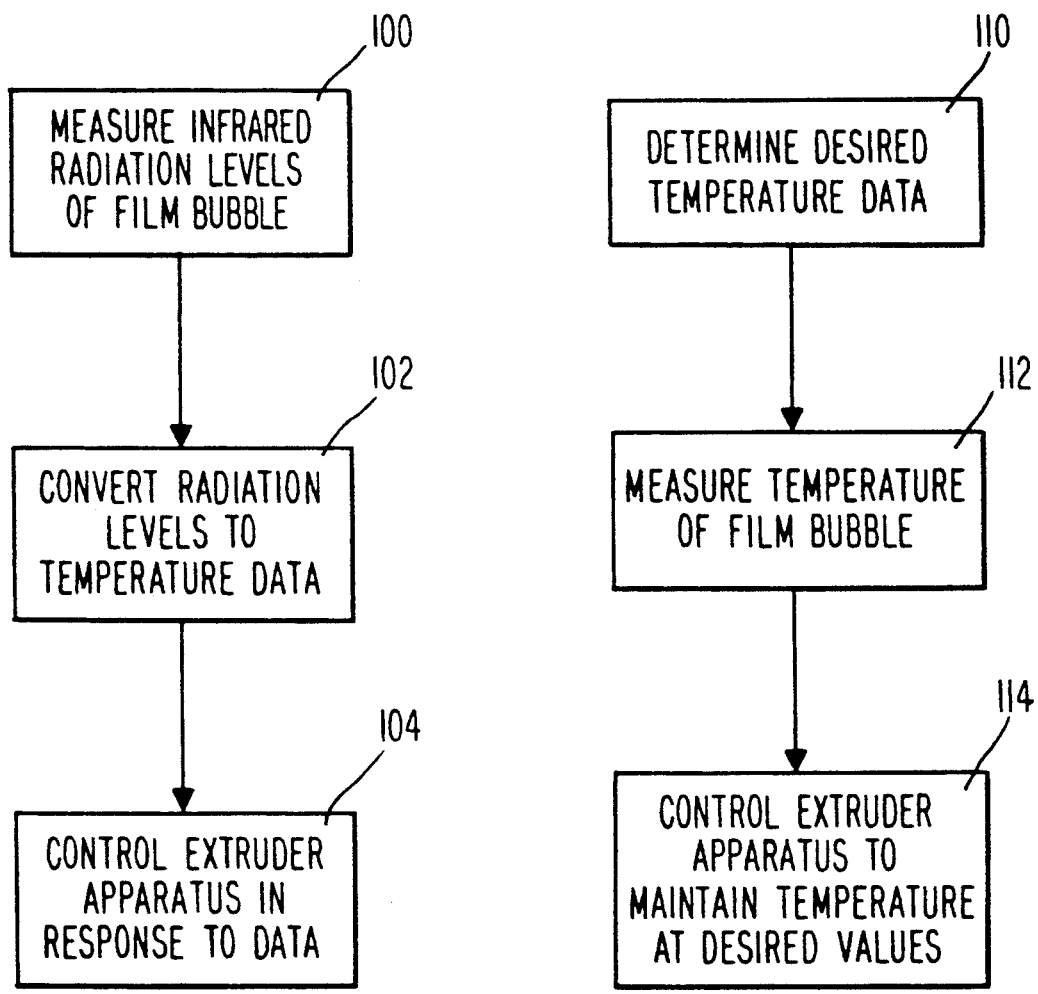

SYSTEM AND METHOD FOR EXTRUDER FROST LINE DETECTION

FIELD OF THE INVENTION

This invention relates to extruder apparatus for producing a blown synthetic resin film, and more particularly to an improved system and method for measuring the temperature at multiple points on the blown film, as well as for measuring the frost line and thickness of the blown film, and controlling the extruder apparatus in accordance with these measurements.

BACKGROUND OF THE INVENTION

Systems and methods are known for manufacturing polymeric products, such as sheets, films or tubes, wherein a liquid polymer or resin is forced under pressure through an extrusion die. The extrusion die generally comprises an annular orifice for blowing the liquid resin into a tubular film. The tubular film is inflated and blown into a cylindrical bubble which eventually congeals downstream of the blowing head. The location at which the blown film bubble congeals is referred to as the frost line, or crystallization point. The blown film bubble, in the congealed state, is subsequently collapsed and flattened farther downstream and is formed into a flat sheet. This flat sheet may be rolled and used in the manufacture of mass quantities of plastic bags or a variety of other sheet like products.

In order to ensure that the flat film product meets quality control standards for properties such as film width and uniformity of the film thickness, various parameters associated with the film blowing process may be controlled. For example, the rotational speed of the extruder screw may be controlled in order to adjust the speed of ejection of the resin from the die head such that the frost line is located and maintained at or near a particular distance above the die head. Also, the die gap settings and the flow of external cooling air which is blown around the outer periphery of the film bubble may be controlled such that the film is blown at a desired thickness which is uniform around the entire circumference of the film bubble. Thus, the extruder apparatus may be controlled in order to ensure that these properties are maintained at or near predetermined ideal values.

Systems are known for controlling the film blowing process in order to maintain predetermined ideal conditions of the blown film bubble. Such systems are disclosed in Upmeier et al, U.S. Pat. No. 4,246,212; Halter, U.S. Pat. No. 4,189,288; and Havens, U.S. Pat. No. 4,101,614. These systems provide measurements of the film properties in a target area on the film bubble and control the film blowing process in order to maintain the film properties in that target area at or near the predetermined values. Havens discloses a temperature sensing device which is focused to read and continually monitor the film temperature at a target point on the bubble, wherein the target point is located below the frost line and above the extruder die head. Upmeier also discloses a sensing device for measuring the temperature of the bubble in a control area which is in the vicinity of the actual frost line position. The temperature at this point is compared to the known crystallization temperature for the resin being used and the system is controlled to maintain the measured value at the control set point value.

However, several problems associated with these systems have been recognized. Although, monitoring the temperature of the bubble and controlling the process parameters in order to maintain the measured temperature at a desired set point value is a desirable method of maintaining the quality of the film product, measuring the temperature at a single point target area provides inadequate results. Temperature measurement at a single point on the bubble is not representative of the mean temperature around the circumference of the bubble, and control based on such a single point measurement does not take into account overall mean changes in the process. Accordingly, control actions made in response to such a measurement may not be effective to produce an end product of a desired quality. Also, Havens recognizes that a target area in the vicinity of the frost line is not a good control area, as crystallization effects occurring at or near the frost line cause the temperature measurements in that area to be unstable and uncharacteristic of the changes below the frost line. Finally, a comparison between the temperature measured in a target area in the vicinity of the frost line and the predicted crystallization temperature for the particular resin being used may be unsatisfactory, as differences in resin composition and blend may cause the actual crystallization temperature to vary from the predicted value.

These references also disclose means for measuring the film thickness and uniformity and controlling the extruder output parameters in order to maintain the film thickness and uniformity at or near the predetermined desired values. However, as these systems are responsive to temperature input from single point temperature sensing devices, the film thickness and uniformity may not be adequately determined based upon this film temperature measurement at only a single point on the bubble. Thus, additional apparatus for the measurement of these properties of the film are necessary, adding to the complexity and cost of the system.

Therefore, there is a need for an improved system for controlling the extruder apparatus process parameters in accordance with measurements of the film temperature simultaneously taken at multiple points vertically up and down and around the circumference of the bubble. The present invention provides an improved system and method which satisfies this need.

SUMMARY OF THE INVENTION

The present invention provides an improved system and method for monitoring and controlling the output of a synthetic resin film blowing system having a die head for ejecting a continuous tube of the film, the die head having a die gap for adjusting the thickess of the film as the film leaves the die head, an extruder screw for adjusting the speed of ejection of the tube from the die head, blowing means for inflating the tube to form a bubble of the film, and cooling means for blowing external cooling air around the bubble. The system further comprises measuring means downstream of the die head for measuring the temperature of the film bubble, flattening means spaced downstream of the measuring means for flattening the bubble to form a flattened web thereof, and coil means for coiling the flattened web into a roll downstream of the flattening means.

The improved measuring means comprises detector means for measuring infrared radiation levels emitted by the film bubble wherein the detector means measures the radiation levels simultaneously at more than one point on the bubble. The infrared image is converted to a multi-dimensional temperature profile representative of the film temperature vertically up and down and around the circumference of the film bubble in the area between the die head and the frost line point at which the blown film bubble congeals.

The multi-dimensional temperature data is processed in a computer controller. The controller provides that the extruder apparatus, such as the die gap and the internal air blowing means and the external cooling air blowing means, is controlled in response to the temperature data in order to maintain a film temperature profile substantially at that which is known to provide a high quality end product.

BRIEF DESCRIPTION OF THE DRAWINGS

FIG. 3 is a flow chart depicting operation of the system depicted in FIG. 1.

FIG. 4 is a flow chart further depicting operation of the system depicted in FIG. 1.

DETAILED DESCRIPTION OF THE PREFERRED EMBODIMENTS

Figure 1:
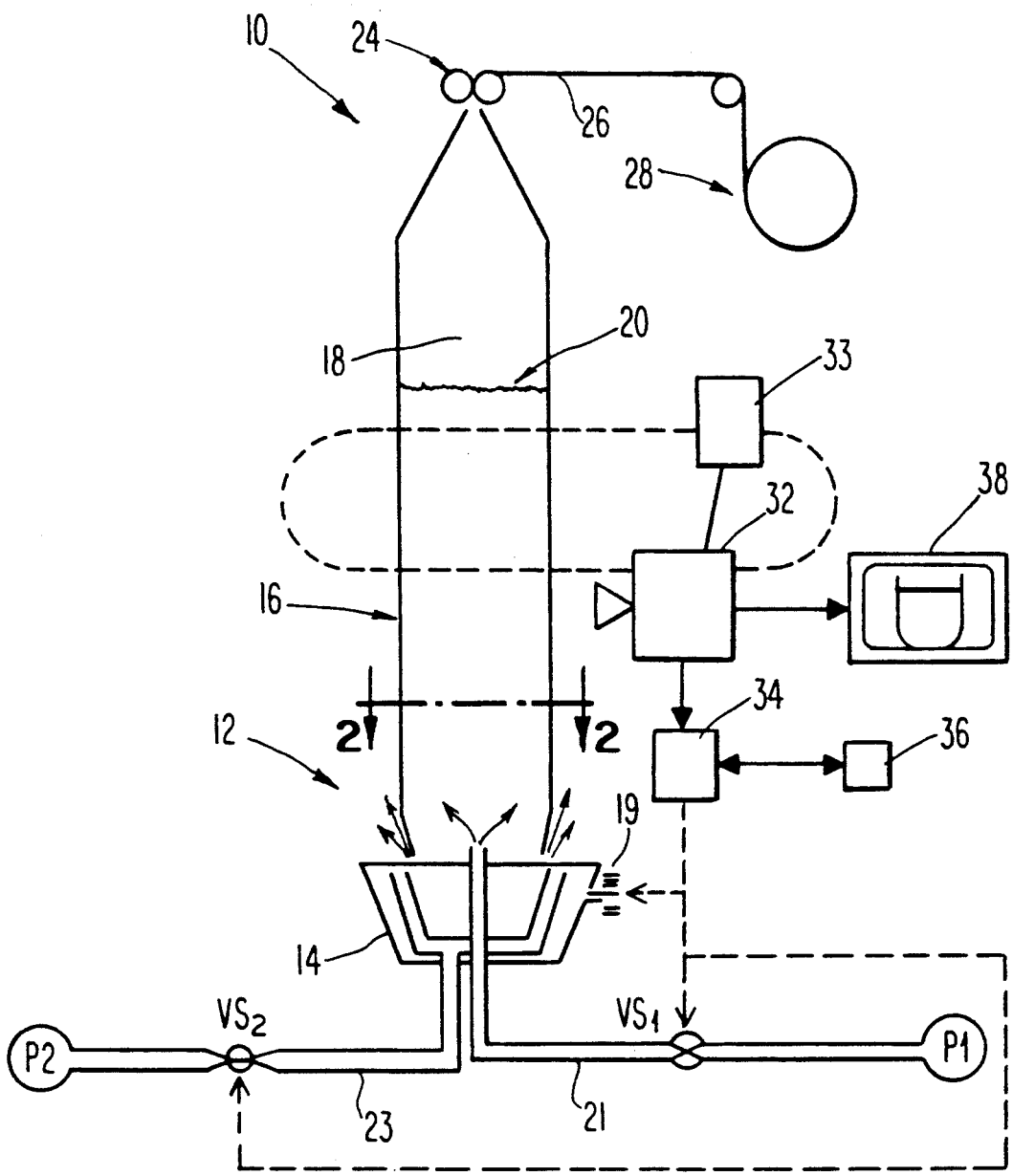
FIG. 1 is a schematic representation of a synthetic resin film blowing system in accordance with the present invention.
Figure 2:
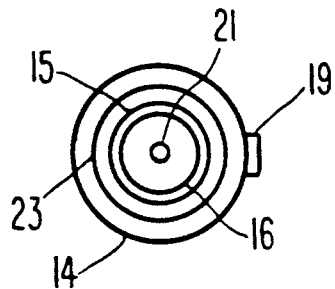
FIG. 2 is an over-head view of the film blowing system along the line 2—2 shown in FIG. 1.

Referring now to the drawings, wherein like reference numerals designate corresponding structure throughout the views, and referring in particular to FIG. 1, a system 10 is shown for monitoring and controlling the temperature of a film tube during a manufacturing process. System 10 includes a manufacturing system 12 having an extrusion die head 14 which is, as conventionally known, associated with a polymerization reactor or other source of pressurized liquid polymer so as to eject an extruded product 16 shaped as a continuous tube 18, commonly referred to as a bubble. Die gap 15 provides for adjusting the thickness of extruded product 16 as the extruded product leaves die head 14, as shown in FIG. 2. Extruder screw 19 provides for adjusting the speed of ejection of extruded product 16, commonly referred to as the extruder screw speed. The extruded product 16 congeals at frost line 20. For reference, tube 18 is blown in the vertical direction in FIG. 1 and tube 18 is circular in horizontal cross-section with the film being located around the circumference of the circle and hollow on the inside.

Die head 14 is in communication with an air passage 21 for introducing a gas, such as air, into the interior of tubular portion 18 as extruded product 16 is forced under pressure through die head 14, thus forming tube 18. Air passage 21 may be communicated with a source P1 of pressurized gas upon the opening of a solenoid actuatable valve $VS_1$. Die head 14 is also in communication with a series of second air passages 23 located around the periphery of die head 14 for blowing external cooling air around the exterior of tube 18. Air passages 23 may be communicated with a source P2 of pressurized gas upon the opening of a solenoid actuatable valve $VS_2$. The external cooling air released from passages 23 provides for cooling of extruded product 16 as it exits die head 14. As discussed in detail below, the interior air and the external cooling air released from passages 21 and 23 may be controlled such that the extruded product 16 congeals at a desired distance above die head 14.

As is well known in the art, tube 18 is tensioned by and passed through a nip roller pair 24 to form flat film 26. Film 26 is eventually advanced into a storage roll 28 for further handling and distribution.

Referring again to FIG. 1, it will be seen that system 10 includes an infrared camera 32 for measuring the infrared radiation levels of extruded product 16 simultaneously at multiple points on tube 18. In order to provide a more accurate representation of the mean film temperature throughout tube 18, camera 32 simultaneously provides a multi-dimensional profile of the infrared radiation levels of extruded product 16.

Camera 32 may be set up such that it views a desired portion vertically up and down on tube 18. In a preferred embodiment, camera 32 is located a distance from tube 18 such that the camera views the portion of the tube vertically from the top of the die head 14 to above the frost line 20. This provides a complete profile in the vertical direction of the critical area of temperature variation between the die head and the frost line, where the extruded product 16 is in a non-congealed state.

In one embodiment of the present invention, camera 32 is stationary. In this embodiment, the camera views only one particular section around the circumference of tube 18. However, since the camera simultaneously views numerous points partially around the circumference of the tube and vertically up and down the tube, the mean temperature profile of the tube may be determined with better accuracy than prior art systems. In a preferred embodiment, the stationary camera views at least 60 degrees around the circumference of the tube.

In a more preferred embodiment, camera 32 is rotated around tube 18. In the most preferred embodiment, camera 32 is rotated 360 degrees around tube 18. Rotating stand 33 wheels camera 32 around a track along the path of the dashed lines shown in FIG. 1.

As discussed below, as camera 32 views tube 18, the system provides that the infrared radiation level data is continuously collected and stored in memory and converted to data indicative of the temperature of the film. Thus, the system provides a temperature profile circumferentially around at least a portion of tube 18 in a horizontal cross-sectional plane of the tube.

The infrared radiation levels detected by camera 32 are input into computer controller 34. Controller 34 continuously collects and stores the infrared radiation level data from camera 32 in memory in a manner well known in the art. Included in controller 34 is a processor for converting the input radiation levels to data indicative of the temperature at the multiple points on tube 18 in a manner well known in the art. As described in detail below, the extruder apparatus, such as die gap 15, extruder screw 19 and air passages 21 and 23, may be controlled in accordance with the temperature data. In a preferred embodiment, controller 34 is used to automatically control the extruder apparatus using servo motors in a manner well known in the art. In another embodiment, the output of controller 34 is read manually by the system operator at an input/output terminal 36 and the extruder apparatus may be controlled manually in accordance with the temperature data.

A video display terminal 38 is connected to camera 32 for providing a visual image of tube 18 during the film blowing process. As is commonly known, the frost line point at which the film congeals is a visual phenomena. Accordingly, the frost line location may be viewed and changes in the frost line position may be monitored on video display terminal 38.

As the infrared camera continuously provides a multi-dimensional temperature profile of the film bubble, process changes may be determined with better accuracy than prior art systems. Accordingly, the extruder apparatus may be more effectively controlled in order to make adjustments to the extruder screw speed and the internal/external air flow around the bubble. These adjustments provide for maintaining the film properties, such as the temperature and film thickness and uniformity, substantially at the desired values which are known to produce the highest quality end product.

In operation, a system 10 according to the embodiment of FIG. 1 operates as follows and as shown in the flow chart of FIG. 3. At 100, camera 32 views the film tube 18 as extruded product 16 is blown out of die head 14. Camera 32 measures the infrared radiation levels simultaneously at multiple points on film tube 18. Depending on the location of camera 32, more or less of the tube 18 may be viewed. As discussed above, in a preferred embodiment camera 32 is positioned so as to view tube 18 from at least the top of die head 14 to at least above the frost line 20. Also as discussed above, in a preferred embodiment camera 32 is continuously rotated 360 degrees around the circumference of tube 18 so as to provide a view of the entire tube 18.

The image detected by camera 32 may be displayed on video display screen 38. In this embodiment the frost line may be visually detected by the system operator. Therefore, changes in the position of the frost line may be visually monitored and adjustments may be made to the extruder apparatus in order to maintain the frost line at or near a desired location.

At 102, the infrared radiation levels measured by camera 32 are input into controller 34 such that the processor converts the radiation levels measured at the multiple points on the film bubble to electrical signals and then further converts the electrical signals to data indicative of the temperature at the multiple points on the film bubble in a manner well known in the art.

At 104, controller 34 provides signals for controlling the extruder apparatus. In one embodiment of the present invention these signals are read manually by the system operator at input/output terminal 36. The system operator then provides manual control of the extruder apparatus in accordance with these control signals. In a preferred embodiment, the film blowing system is controlled automatically in response to the signals from controller 34 in a manner well known in the art.

Various apparatus of the film blowing system may be controlled in accordance with the signals from controller 34. The extruder screw speed at extruder screw 19 is controlled in response to signals from controller 34 in order to make adjustments to the speed of ejection of the extruded resin. Die gap 15 is controlled in order to adjust the film thickness as extruded product 16 leaves die head 14. The flow of pressurized air at the interior of film tube 18 and the flow of pressurized external cooling air around the tube may be controlled as signals from controller 34 are provided to adjust the flow of air through air passages 21 and 23 respectively. However, the present invention is not intended to be limited to this description and control of the remaining apparatii of the film blowing system may be controlled in accordance with the multi-dimensional temperature profile provided by the infrared camera.

As the film blowing system is operated, conditions will be achieved wherein the end product produced is of a desired high quality. Accordingly, it is desirable to continuously operate the extruder apparatus under these conditions. Referring to FIG. 4, at 110 the desired temperature profile is determined. The present invention provides for measuring the temperature simultaneously at multiple points on the film bubble at 112 and controlling the system apparatus at 114 in order to maintain the temperature of the film at these points substantially at the desired values. Maintaining the temperature of the film at the multiple control points substantially at the desired values provides that the film resin congeals at a desired height, the frost line location, above the die head 14. In a preferred embodiment, the temperature of the film is maintained within about 1.5° F. of the desired value at each control point. In a more preferred embodiment, the film temperature is maintained within about 1° F. of the desired value at each control point. In a most preferred embodiment, the film temperature is maintained within about 0.5° F. of the desired value at each control point.

As infrared camera 32 provides for a multi-dimensional temperature profile of the film in the non-congealed state between the die head 14 and the frost line 20, a more effective control system is provided and an end product having a desired quality is more consistently produced.

The multi-dimensional temperature profile of the film bubble provided by infrared imaging may also be used to determine the thickness of the extruded film. Based upon the known physical and thermodynamic properties of the resin being used, the temperature data may be combined with the standard extruder measurements, such as the extruder output rate and the internal and external air flow rate and temperature, in order to derive the film thickness. By performing linear regressions on the system data (film temperature, output rate, etc.) which is continuously collected and stored in memory, coefficients are determined that represent the relationship of the film temperature and the extruder measurements to the film thickness for a particular film.

In accordance with the system and method described above, the extruder apparatus may be controlled to maintain the temperature throughout the film at values which provide a film of a desired thickness. The system is controlled in order to maintain the film thickness substantially at a preselected desired value. In a preferred embodiment, the film thickness is maintained within about 5 mils of the preselected value. In a more preferred embodiment, the film thickness is maintained within about 0.5 mils of the preselected value. In a most preferred embodiment, the film thickness is maintained within about 0.1 mils of the preselected value. Thus, the present invention provides a system and method wherein the film thickness may be determined and controlled without the addition of costly apparatus for measuring the film thickness.

Although particular embodiments of the present invention have been described and illustrated herein, it is recognized that modifications and variations may readily occur to those skilled in the art. Consequently, it is intended that the claims be intended to cover such modifications and equivalents.

What is claimed is:

1. An improved synthetic resin film blowing system of the kind having (a) a die head for ejecting a continuous tube of said film, said die head having a die gap for adjusting the thickness of said film as said film leaves said die head, an extruder screw for adjusting the speed of ejection of said tube from said die head, blowing means for inflating said tube to form a bubble of said film, and cooling means for blowing external cooling air around said bubble; (b) measuring means downstream of said die head for measuring the temperature of said bubble; (c) flattening means spaced downstream of said measuring means for flattening said bubble to form a flattened web thereof; and (d) coil means for coiling said flattened web into a roll downstream of said flattening means; the improvement wherein said measuring means comprises an infrared camera for measuring and for providing a multi-dimensional profile of infrared radiation levels emitted by said bubble, said camera measuring said radiation levels simultaneously at more than one point on said bubble, said camera located proximate said bubble to multi-dimensionally measure the temperature at points on said bubble between said die head and proximate to and downstream of the frost line of said bubble.

2. A method for controlling a synthetic resin film blowing system of the kind having (a) a die head for ejecting a continuous tube of said film, said die head having a die gap for adjusting the thickness of said film as said film leaves said die head, an extruder screw for adjusting the speed of ejection of said tube from said die head, blowing means for inflating said tube to form a bubble of said film, and cooling means for blowing external cooling air around said bubble; (b) measuring means downstream of said die head for measuring the temperature of said bubble; (c) flattening means spaced downstream of said measuring means for flattening said bubble to form a flattened web thereof; and (d) coil means for coiling said flattened web into a roll downstream of said flattening means;

wherein the method comprises the steps of:
measuring the temperature of said bubble simultaneously at at least two points on said bubble to provide a multi-dimensional profile of the temperature of said bubble in the region between said die head and proximate to and downstream of the frost line of said bubble;
comparing the temperature at each measured point with a preselected value for the temperature at each measured point; and
controlling the output of said film blowing system to maintain the temperature at each measured point on said bubble substantially at said preselected value.

3. The improved system of claim 1, wherein said infrared camera is stationary.

4. The improved system of claim 3, wherein said infrared camera provides a view of at least 60 degrees around the circumference of said bubble.

5. The improved system of claim 1, further comprising rotating means for rotating said infrared camera around said bubble.

6. The improved system of claim 5, wherein said rotating means rotates said infrared camera 360 degrees around said bubble.

7. The improved system of claim 1, further comprising processing means for converting said radiation levels to data indicative of the temperature at said more than one point on said bubble.

8. The improved system of claim 7, wherein said data provides a temperature profile circumferentially around at least a portion of said bubble in a horizontal cross-sectional plane of said bubble.

9. The improved system of claim 1, further comprising displaying means for displaying the image viewed by said camera.

10. The improved system of claim 1, further comprising controller means for controlling said film blowing system, said controller means responsive to said detector means.

11. The improved system of claim 10, wherein said controller means controls said die gap.

12. The improved system of claim 10, wherein said controller means controls said extruder screw.

13. The improved system of claim 10, Wherein said controller means controls said blowing means.

14. The improved system of claim 10, wherein said controller means controls said cooling means.

15. A method for controlling a synthetic resin film blowing system of the kind having (a) a die head for ejecting a continuous tube of said film, said die head having a die gap for adjusting the thickness of said film as said film leaves said die head, an extruder screw for adjusting the speed of ejection of said tube from said die head, blowing means for inflating said tube to form a bubble of said film, and cooling means for blowing external cooling air around said bubble; (b) measuring means downstream of said die head for measuring the temperature of said bubble; (c) flattening means spaced downstream of said measuring means for flattening said bubble to form a flattened web thereof; and (d) coil means for coiling said flattened web into a roll downstream of said flattening means;

wherein the method comprises the steps of:
measuring infrared radiation levels emitted by said bubble at a plurality of points about the circumference of said bubble, said radiation levels measured by a single detector located proximate said bubble to simultaneously and multi-dimensionally measure the temperature at points on said bubble between said die head and proximate to and downstream of the frost line of said bubble;
converting said radiation levels to multi-dimensional data indicative of the temperature at said measurement points on said bubble; and
controlling said film blowing system in accordance with said data.

16. The method of claim 15, wherein said infrared radiation levels are measured by an infrared camera.

17. The method of claim 16, further comprising rotating said camera around said bubble.

18. The method of claim 17, wherein said camera is rotated 360 degrees around said bubble.

19. The method of claim 15, further comprising displaying the image viewed by said camera on a video display screen.

20. The method of claim 15, wherein said controlling step is characterized by controlling said system manually by the system operator.

21. The method of claim 15, wherein said controlling step is characterized by controlling said system automatically.

22. The method of claim 15, wherein said controlling step is characterized by controlling said die gap in accordance with said data.

23. The method of claim 15, wherein said controlling step is characterized by controlling said extruder screw in accordance with said data.

24. The method of claim 15, wherein said controlling step is characterized by controlling said blowing means in accordance with said data.

25. The method of claim 15, wherein said controlling step is characterized by controlling said cooling means in accordance with said data.

26. The method of claim 2, wherein said controlling step is characterized by maintaining the temperature at each measured point within about 1° F. of said preselected value.

27. The method of claim 2, wherein said controlling step is characterized by maintaining the temperature at each measured point within about 0.5° F. of said preselected value.

28. The method of claim 2, comprising the further step of controlling said film blowing system to maintain the thickness of said film substantially at a preselected value.

29. The method of claim 28, wherein said thickness controlling step is characterized by maintaining the thickness of said film within about 0.5 mils of said preselected value.

30. The method of claim 28, wherein said thickness controlling step is characterized by maintaining the thickness of said film within about 0.1 mils of said preselected value.

* * * * *